(No Model.)  O. H. JEWELL.  2 Sheets—Sheet 1.
FEED WATER PURIFIER.
No. 377,390.  Patented Feb. 7, 1888.
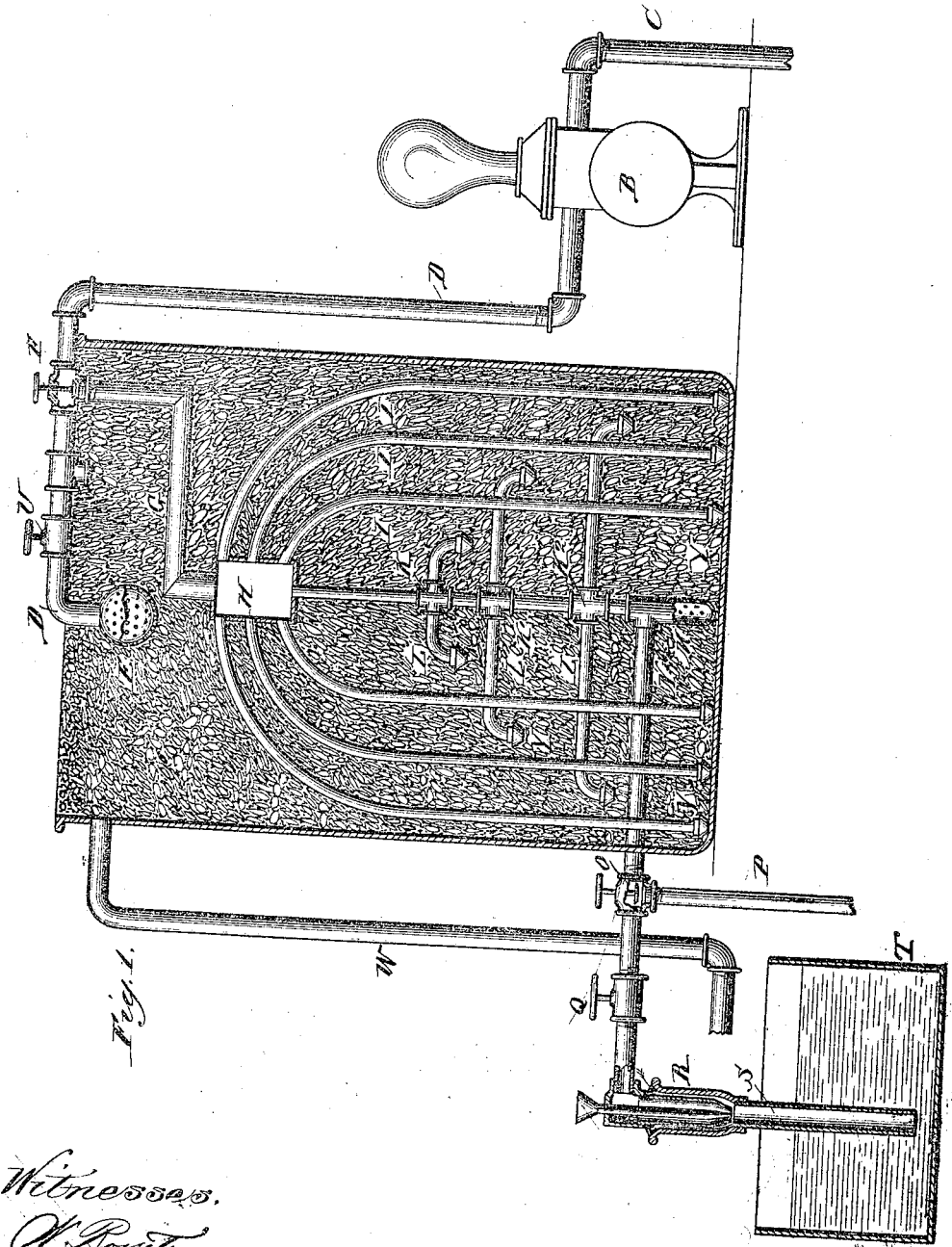

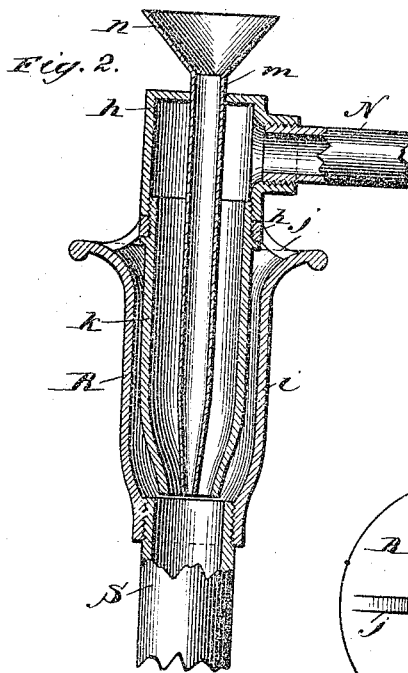
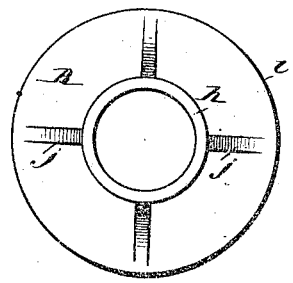
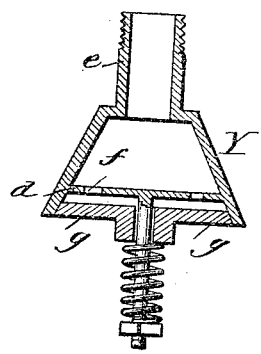
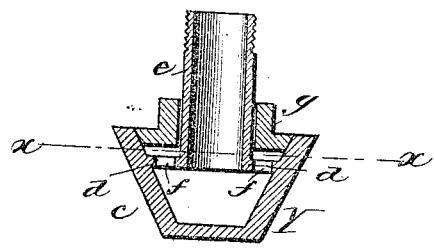
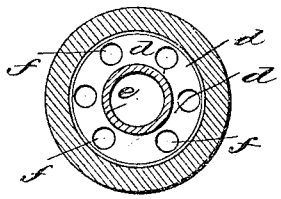

UNITED STATES PATENT OFFICE.

OMAR H. JEWELL, OF CHICAGO, ILLINOIS.

FEED-WATER PURIFIER.

SPECIFICATION forming part of Letters Patent No. 377,390, dated February 7, 1888.

Application filed August 16, 1887. Serial No. 247,116. (No model.)

*To all whom it may concern:*

Be it known that I, OMAR H. JEWELL, a citizen of the United States of America, residing at Chicago, in the county of Cook and State of Illinois, have invented certain new and useful Improvements in Feed-Water Purifiers, of which the following is a specification, reference being had therein to the accompanying drawings.

This invention relates to apparatus for filtering and purifying water for feeding steam-boilers and for other purposes; and it mainly consists in the construction of automatic spray-valves that, with reversing the current through the filter, will distribute the water uniformly, all as will be hereinafter more fully described and specifically claimed.

In the accompanying drawings, Figure 1 represents a sectional elevation of the entire apparatus; Figs. 2 and 3, a vertical section through center and a sectional plan of an air-siphon for admixing air with the water; Figs. 4 and 5, a vertical cross-section and a sectional plan on line $x\ x$ in Fig. 4 of the automatic spray-valve, and Fig. 6 is a modified construction of the spray-valve.

Corresponding letters in the several figures of the drawings designate like parts.

A denotes the tank, being preferably cylindrical, and that, as shown, may be open on top.

B is the steam-pump, of any usual construction, with suction-pipe C and discharge-pipe D. This pipe D communicates with a sprinkler or rose-head, E, located in the top portion of tank A. A T-valve, F, is interposed in pipe D, connecting a branch pipe, G, that provides communication with a chamber, H, whence a series of pipes, I, curved on top, lead vertically down toward the bottom of the tank. From the bottom of chamber H also leads vertically down a pipe, J, provided with three (more or less) star-couplings, K K' K'', with radial pipes L of downwardly-increasing length and downwardly-curved ends. To the lower end of pipe J is coupled a strainer, M, having coupled again in its upper portion a horizontal pipe, N, having T-valve O, with vertical branch pipe P and stop-valve Q, and connecting with the siphon R, that again has connected pipe S, leading into the bottom of reservoir T. Pipe D, intermediate of valve F and sprinkler-head E, is provided with a stop-valve, U. An overflow-pipe, W, as well as pipe P, leads into the sewer or other waste-water channel.

Each pipe I and L has coupled to its end an automatic spray-valve, Y, each consisting of a conical shell, $c$, the plate $d$ of which has a cylindrical screw-nozzle, $e$, for connecting a pipe, I or L, and around this screw-nozzle $e$ the plate $d$ is perforated with holes $f$. An annular valve, $g$, is fitted over the nozzle $e$, to be guided thereon, and its conical rim is ground into the projecting rim of conical casing $c$. Water being forced through nozzle $e$ into casing $c$, while passing through perforations $f$, will raise valve $g$, squirting out a thin circular spray between the upper edge of casing $c$ and the rim of valve $g$, thereby distributing the water over a large surface and agitating the filter-bed, loosening all impurities and carrying them to the top of the tank.

The siphon R consists of a casing, $h$ and $i$, connected by ribs $j$. Into one side of casing $h$ is screwed the end of a pipe, N, and into the bottom end of casing $i$ is coupled the pipe S. A nozzle, $k$, having a contracted lower end, is screwed into the bottom of casing $h$, to form a continuation thereof, discharging into pipe S, and to form an annular air-channel, $l$, around such nozzle $k$, that will communicate with the water-jet issuing from the mouth of such nozzle K. A tube, $m$, having a funnel-shaped head, $n$, and a contracted lower end, is projected through the top of casing $h$ into nozzle $k$, also for admitting air to intermingle with the jet of water forced through such nozzle K. The atmospheric air thus intermingled with the water and forced down in the bottom of the reservoir T will thereby provide a continuous supply of oxygen that will destroy all germs contained in the water, and will thereby preserve the water in a fresh and healthful state suitable for drinking.

The tank A being filled with gravel and sand, the operation of the apparatus is as follows, to wit: The valves F and O being closed and the valves U and Q being opened, the water lifted by the pump B will be distributed by sprinkling-head E over the surface of such gravel and sand, will filter through the same, and will then pass off through strainer M, pipe N, siphon R, and pipe S into reservoir T, leaving behind all impurities and being refreshed by the admixture of atmospheric air.

For washing out and removing the impurities collecting in the gravel and sand of tank A, which becomes necessary to be done from time to time, the valves V, O, and Q are closed and the valve F is opened, when the water forced by pump B will pass through pipe G into box H, and thence through branch pipes I and L, squirting out from the automatic spray-valves Y, to be distributed through the gravel and sand, rising upward therein, and escaping through overflow-pipe W into the sewer, and carrying with it all the impurities collected in the gravel and sand. After thus being washed out the valve F is closed and the valves V and O are opened, for the first water filtered through the gravel and sand again to pass off through pipe P into the sewer, and to carry off such impurities collected in the bottom of tank A during the time the current was reversed until the water filtered shows to be clear, when valve O is closed and valve Q is opened again for the filtered water to discharge into reservoir T. After each washing out the valves $g$ will close again upon their seats in casing $c$ by their own gravity, thus excluding sand or gravel from passing into and interfering with the operation of the automatic spray-valves Y.

The spray-valves may be made oblong, square, or polygonal, or may be placed to spray sidewise or downward, in which case a spring or other well-known mechanical devices may be applied for opening or closing the valves, as shown in Fig. 6.

The siphon R may be placed with advantage anywhere between the pump B and the filtering tank for the purpose of destroying the germs and animal life therein before filtering the water.

What I claim is—

1. In an apparatus for the purpose described, the spraying-valves Y, each consisting of a conical shell, $c$, a pipe-coupling neck, $e$, perforated plate $d$, fixed in the conical shell, and a valve, $g$, guided in the mouth of the conical shell, as set forth.

2. In an apparatus for the purpose described, the automatic spray-valves Y, each consisting of a conical shell, $c$, with screw-neck $e$, and valve $g$, guided on neck $e$, all substantially as set forth.

In testimony whereof I affix my signature in presence of two witnesses.

OMAR H. JEWELL.

Witnesses:
WM. H. LOTZ,
OTTO LUBKERT.